Jan. 1, 1963     R. I. DOUGLAS     3,071,325
INSULATING FISH PLATES
Filed Dec. 24, 1959
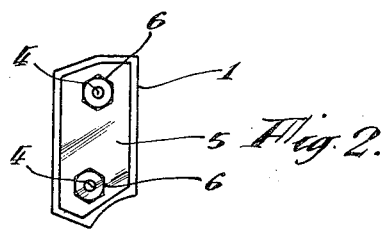
Fig. 2.
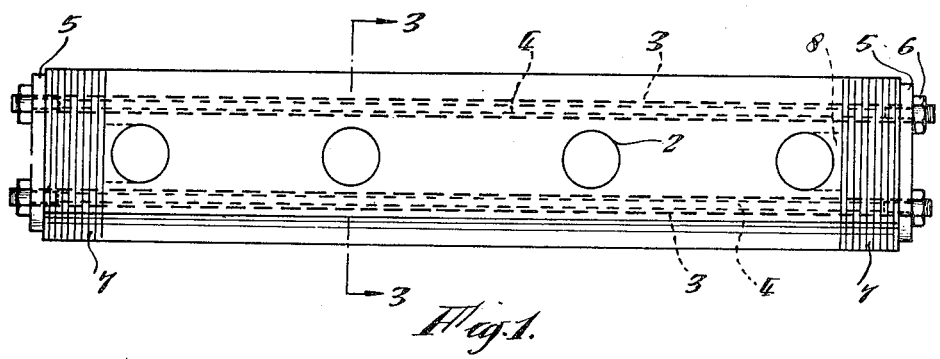
Fig. 1.
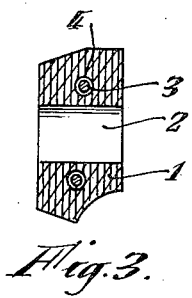 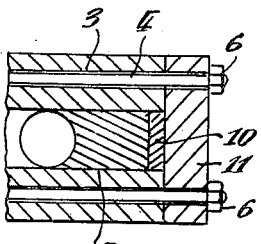
Fig. 4.     Fig. 3.
Inventor
Robert Ian Douglas
by Albert Jacobs
Attorney

United States Patent Office 3,071,325
Patented Jan. 1, 1963

3,071,325
INSULATING FISH PLATES
Robert Ian Douglas, Pinner, England, assignor to Permali Limited, Gloucester, England
Filed Dec. 24, 1959, Ser. No. 862,007
Claims priority, application Great Britain Dec. 31, 1958
4 Claims. (Cl. 238—159)

This invention relates to insulating fish plates for railway track circuit insulation including one or more insulating plastics materials. A suitable material is laminated densified wood which comprises layers of wood veneer impregnated with synthetic resin and densified. The insulating fish plates are attached to the rail by bolts passing through aligned bolt holes provided in the fish plate and in the rail.

Laminated densified wood and plastics materials generally have high tensile strength, but relatively low shear strength and the object of this invention is to provide means for reducing bolt hole shear.

According to this invention we provide an insulating fish plate incorporating post or pre-stressed longitudinal bars or wires.

According to another feature of the invention we provide a member made of insulating material for a fish plate having longitudinal holes therethrough for receiving wires or bars.

One form of the invention is illustrated in the accompanying drawing, wherein:

FIG. 1 is a front view of a fish plate,
FIG. 2 is an end view of the same fish plate,
FIG. 3 is a section taken on line 3—3 of FIG. 1, and
FIG. 4 is a front view of a portion of a modified fish plate.

Referring to the drawing, the fish plate 1 is made of densified wood the laminations of which run longitudinally of the fish plate, the plane of the said laminations being vertical as shown in FIG. 3. The fish plate is provided with the usual bolt holes 2 for the purpose of attaching it to the rails. Two longitudinal bores 3 are provided in the fish plate extending from end to end into which high tensile steel bars 4 are placed the said steel bars 4 projecting from each end of the fish plate and being screw threaded. The projecting ends of the bars 4 pass through holes in end plates 5 or blocks of greater thickness and each is provided with a nut 6. The bars 4 after being positioned are post tensioned by screwing up the nuts 6 so that as the rails contract in use the bars are put in tension due to the pressure by the fish bolts against the material at the outside of the bolt holes 2.

If desired, the fish plate 1 may be made of three sections of densified wood by reducing the length of the main portion 1 and applying a section 7 at each end, the laminations of each section 7 running at right angles to those of the main section. A centre part 8 is removed from each end portion adjacent the two end holes 2 and the space at each end is filled with a steel reinforcement.

Instead of being made of densified wood the fish plates may be made of other plastics material, for example, resin impregnated fibre glass, or the fish plate can be made as a composite body consisting of veneers of wood interleaved with fibre glass fabric.

Referring to FIG. 4 the sections 7 are omitted and the removed centre portions 9 extend to the end of the fish plate. The spaces 9 are filled with material which is in itself insulating, for example densified laminated wood with the laminations at right angles to those of the fish plate 1. Alternatively the spaces 9 are filled with metal except for a layer 10 of insulating material provided adjacent the end blocks 11 which if desired may be plates 5 shown in FIG. 1.

I claim:

1. An insulating fish plate for railway track circuit insulation comprising a substantially unitary member of reinforced plastic material capable of withstanding vertical impact and bending forces and having at least two longitudinally extending bores thereof, a pressure plate at each end of said member, each such plate being provided with holes in alignment with said bores, a reinforcing bar extending through each such bore and the aligned pressure plate holes, and means on said bars to maintain said member in compression and said bars stressed, said fish plate being adapted to be attached to railway rails by bolts passing through aligned bolt holes provided in the fish plate and rails and said member having a central portion of longitudinal laminations and end sections of laminations disposed at right angles to the laminations of the central portion.

2. An insulating fish plate for railway track circuit insulation comprising a substantially unitary member of reinforced plastic material capable of withstanding vertical impact and bending forces and having at least two longitudinally extending bores thereof, a pressure plate at each end of said member, each such plate being provided with holes in alignment with said bores, a reinforcing bar extending through each such bore and the aligned pressure plate holes, and means on said bars to maintain said member in compression and said bars stressed, said fish plate being adapted to be attached to railway rails by bolts passing through aligned bolt holes provided in the fish plate and rails and said member having end portions removed and replaced by a different material.

3. A fish plate according to claim 2, in which said different material is metal and in which there is a layer of insulating material between the metal and the end plates.

4. An insulating fish plate for railway track circuit insulation comprising a substantially unitary member of reinforced plastic material capable of withstanding vertical impact and bending forces and having at least two longitudinally extending bores thereof, a pressure plate at each end of said member, each such plate being provided with holes in alignment with said bores, a reinforcing bar extending through each such bore and the aligned pressure plate holes, and means on said bars to maintain said member in compression and said bars stressed, said fish plate being adapted to be attached to railway rails by bolts passing through aligned bolt holes provided in the fish plate and rails, said member being composed of densified laminated wood interleaved with fibre glass fabric and having a center part removed from each end and replaced by densified laminated wood, the laminations of which are disposed at right angles to the laminations of said member.

References Cited in the file of this patent

UNITED STATES PATENTS

| | | |
|---|---|---|
| 1,033,775 | Andrew | July 30, 1912 |
| 1,944,237 | Heineman | Jan. 23, 1934 |
| 2,075,633 | Anderegg | Mar. 30, 1937 |
| 2,210,553 | Miller | Aug. 6, 1940 |
| 2,877,506 | Almoslino | Mar. 17, 1959 |

FOREIGN PATENTS

| | | |
|---|---|---|
| 724,800 | Great Britain | Feb. 23, 1955 |
| 775,256 | Great Britain | May 22, 1957 |
| 796,058 | Great Britain | June 4, 1958 |
| 796,415 | Great Britain | June 11, 1958 |